Oct. 10, 1939.  J. R. BROCKMAN  2,175,245
ELECTRIC SOCKET
Filed July 19, 1937   2 Sheets-Sheet 2
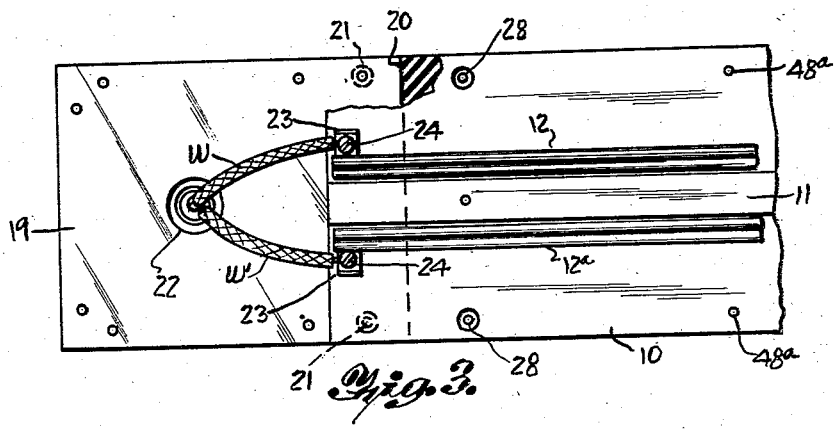
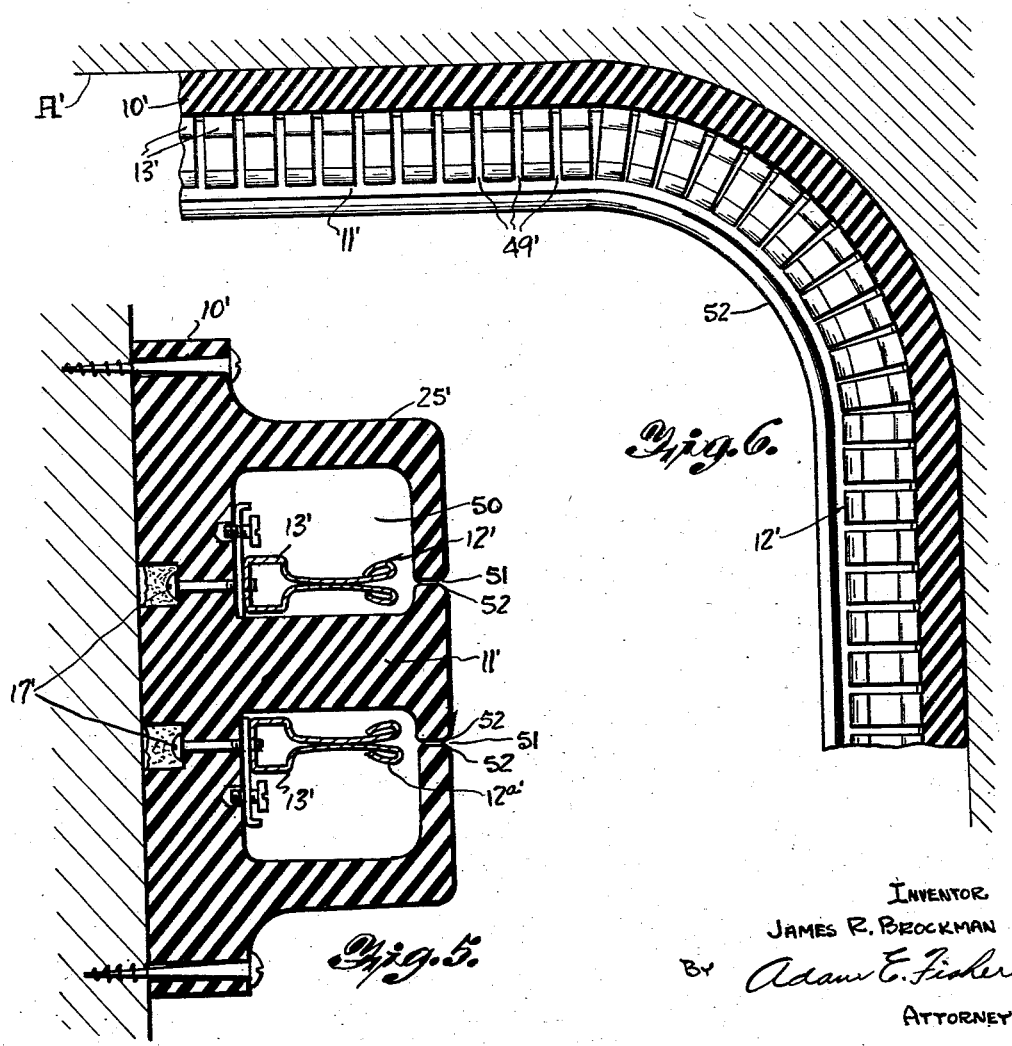
INVENTOR
JAMES R. BROCKMAN
BY Adam E. Fisher
ATTORNEY Patented Oct. 10, 1939

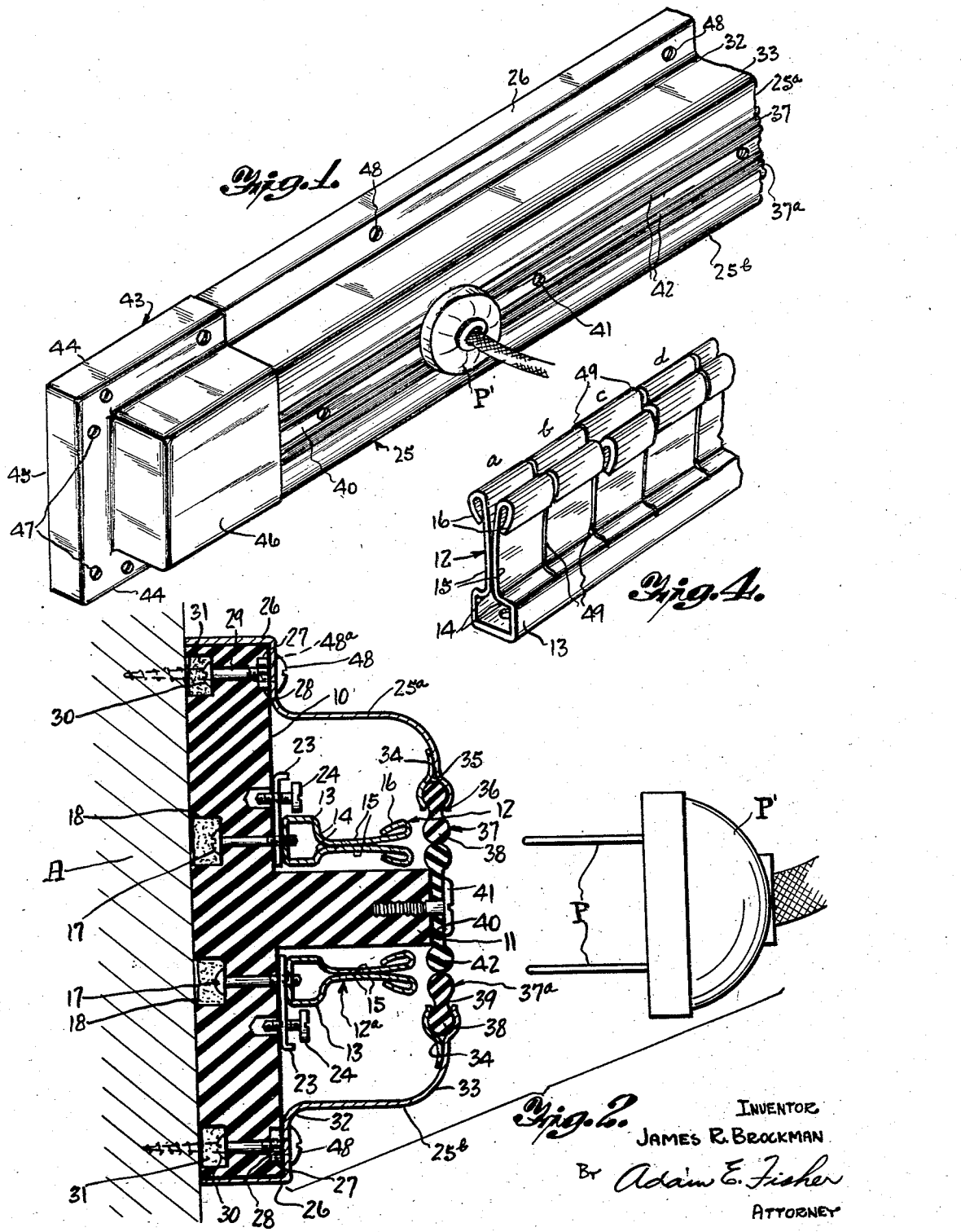

2,175,245

UNITED STATES PATENT OFFICE 2,175,245

ELECTRIC SOCKET

James R. Brockman, St. Louis, Mo.

Application July 19, 1937, Serial No. 154,334

2 Claims. (Cl. 173—334.1)

This invention relates to improvements in electric sockets, and the main object is to provide a socket unit or member made up in the form of an ornamental strip or molding adapted to be fastened to a wall and permit the convenient attachment thereto of one or more conventional attachment plugs such as used for supplying current to appliances of various kinds.

Another object is to provide an electric socket of this kind wherein the contact members or bus bars are arranged to provide a quick detachable connection for the male member or plug, the said bus bars being extended in parallelism throughout the length of the socket member to permit mounting the prongs of the plug at any place along their length.

Another object is to provide a socket unit wherein the bus bars are each formed up from a strip of metal bent along its longitudinal axis into a substantially U-shaped form with normally convergent coacting spring jaws, the bars thus formed being set up in parallel relationship along an insulating base so as to receive a conventional plug, and the said jaws being split or parted transversely at equally spaced points along their length so as to provide relatively free portions to more readily accommodate the prongs.

Another object is a provide a socket member including an insulating base with a central longitudinally extended rib or web along each side of which the bus bars are located and by which they are insulated, one from the other, there being a metal plate extended from one end of the base for leading in the wires carrying current to the bus bars, and a housing made up of end sections secured along the longitudinal margins of the base terminating at their free edges short of an alignment with the bus bars so as to permit the plug to enter and reach the bus bars, there being also an additional end cap for covering and enclosing the aforesaid plate and the wires leading in therethrough.

A further object is to provide means for closing the space between the said housing sections so as to conceal and protect the bus bars, the said means comprising live or soft rubber bead strips attached to the free margins of the housing sections and a center soft rubber strip secured to the rib along the base, the adjacent margins of the strips meeting along lines parallel with and in registry with the bus bars and these margins having sufficient resiliency so that the plug prongs may be inserted therethrough to reach the bus bars.

Still a further object is to provide a socket unit wherein the entire base and housing is made up from a relatively soft and pliable rubber and the bus bars having relatively wide portions cut out at intervals along their length so that the socket unit as a whole may be readily flexed and bent to follow the contours of walls and to mount around corners thereof.

With these and other objects in view the invention resides in the novel construction and arrangement of parts as hereinafter fully set forth and claimed, reference being had to the accompanying drawings as showing a preferred embodiment of my invention for purposes of exemplification.

In the drawings:

Figure 1 is a perspective view of the end portion of the socket unit made up in accordance with my invention.

Figure 2 is an enlarged cross section therethrough.

Figure 3 is a fragmental side elevation of the socket unit, the housing and end cap being removed.

Figure 4 is a detail view in perspective showing the construction of one of the bus bars.

Figure 5 is a longitudinal cross section through a section of a flexible socket unit showing the same bent to follow the contour of a wall.

Figure 6 is an enlarged perspective view of a modified, flexible form of socket unit.

Referring now with more particularity to the drawings, my invention is shown as comprising a base 10, the same being in the form of an elongated strip of "Bakelite," fiber or other insulating material and having a medial longitudinally extending rib or web 11 projecting from one face, this being hereinafter termed, for convenience in description, the outer side of the structure as a whole. The base, of course, may be of any length according to the desired length of the socket unit when completed and might be made up in certain standard lengths such as might be required. The bus bars 12 and 12a are each made up from an elongated strip of spring metal bent along a medial line to form a substantially U-shaped base portion 13, the legs of which are then bent together as at 14 and extended in meeting normally converging relation to form coacting jaws 15 extending along the length of the bars. The free margins 16 of the jaws are turned outwardly and back on themselves as shown forming outwardly flaring entrances therebetween for convenience in the introduction of the plug prongs between the jaws. The bus bars are secured to the base 10 along opposite sides of the rib 11, the bars resting on their widened base portions 13 and being secured in place by screws 17 passed through the base from the inner side outwardly and threaded into the bars. Recesses 18 in the inner face of the base 10 receive the heads of the screws 17 and are filled with sealing compound in well known manner. The bars 12 and 12a then stand in parallel relationship one on each side of the base rib 11 with the free margins of the jaws 15 turned outwardly alongside the rib but terminating a short distance inwardly of the end face of the rib. The space between the bus bars is such as to receive and nicely fit the prongs P of the usual attachment plug P' as the prongs are entered between and gripped by the jaws.

At one end of the base 10 a metal terminal or outlet plate 19 is mounted, this plate being of the same width as the base and being secured at one margin in a recess 20 formed in the inner face by means of screws 21. A portion of the plate 19 thus extends clear from the end of the base flush with the inner face thereof and this portion of the plate has a medially located "knockout" or opening 22 through which the wires W—W' may be led. Secured under the ends of the bus bars 12—12a adjacent this end of the unit are the terminal clips 23 mounted under the screws 17 and carrying terminal screws 24 by which the wires W—W' are connected to the bus bars as shown.

A housing or cover 25 is provided for protecting the bus bars and same comprises two complementary sections 25a—25b each formed up from sheet metal having an edge 26 of right angled cross section to fit nicely over the longitudinal corners and edges of the base. At intervals along these edges 26, nuts 27 are spot welded to the inner sides and the base 10 has recesses 28 which receive these nuts, the said recesses being aligned with bores 29 through which screws 30 are passed (from the inner side of the base) to screw into the nuts and hold the housing sections in place. The heads of these screws 30 are also recessed and covered by sealing compound as shown at 31. From these edges 26 the housing sections 25—25a are turned outwardly at 32 and then turned toward the rib 11 as at 33 forming L-shaped cross sections, the free margins terminating considerably short of an alignment with the bus bars 12—12a and standing outwardly therefrom. These free margins of the housing sections carry narrow inner retainer strips 34 and both the margins of these sections and the strips are first flared apart and then turned inwardly slight so as to provide retaining grooves 35 having restricted entrances or openings 36 as shown.

Live or relatively soft rubber strips 37—37a are provided and have a figure eight or hourglass cross sectional conformation or shape with the enlarged rounded margins or beads 38 joined by the relatively restricted necks or center portions 39. One of these margins 38 of each strip is inserted in each groove 35 so that the strips extend along the entire length of the housing and with the free margins 38 standing in alignment with the entrances between the jaws 15.

A center strip 40 also of live or soft rubber is secured by screws 41 along the outer face of the base web 11 and has the rounded and laterally widened beads or margins 42 which extend from the web into meeting engagement with the free margins of the strips 37—37a.

To enclose the wires W—W' and the plate 19 an end cap 43 is provided and is made up from sheet metal with the right angled edges 44 and end 45 and the outwardly bulging center portion 46 so that it may slip endwise over the end of the base 10 and housing 25 and will fill out nicely the end thereof (Figure 1). This cap 43 is secured in place by screws 47 threaded into the plate 19. All metal parts of the housing, cap and plate may be grounded for safety sake.

In use the socket unit so formed is secured to the wall A in any desired position by means of screws 48 which are passed through apertures 48a in the edges of the housing 25 and base 10 and secured in the wall. The wires W—W' are then led through the plate 19 and secured to the terminals 23 and (the other ends being connected to the house wiring) supply current to the bus bars 12—12a. The usual attachment plug P' may then have its prongs P inserted readily between the margins of the rubber strips 37—37a and 40 so that they enter between the jaws 15 and supply current to the appliance associated with the plug. It will be readily apparent that the plug may be thus inserted anywhere along the length of the unit and also that a number of plugs may be used as desired.

To facilitate the connection of the plugs the bus bars 12—12a are provided with cross cuts or slits 49 at spaced points along their entire lengths, these cuts running down through the jaws 15 to the base portions 13 as shown. These cuts separate the jaws into relatively short sections along their length as indicated at a, b, c and d in Figure 4 and allow any of these sections to spring apart freely to receive the plug prongs P without affecting adjacent sections. As a result the plug prongs may be very readily inserted into the bus bars and at the same time the bars will have sufficient grip to provide a firm electrical contact. This parting of the bus bars also allows plugs to be inserted right alongside each other without interference such as might occur were a long stretch of the bars spread by the prongs of one plug.

The use of the grounded metal housing with the insulating closures for the slots leading to the bus bars provides a completely enclosed and safe assembly preventing any chance of shock from the wiring. At the same time the nature of the rounded beads at the margins of the rubber strips 37, 37a and 40 allows the plug prongs to readily penetrate between for engagement with the bus bars.

A modified form or species of my invention is shown in Figures 5 and 6, the same being an entirely flexible assembly wherein the base 10', rib 11' and housing 25' are all integrally formed and molded of a relatively soft rubber. This arrangement provides spaces 50 each side of the rib 11' and inwardly of the housing 25' to receive the bus bars 12 and 12a' which are secured in place by the screws 17' as shown. Each side of the rib 11' narrow slits 51 are formed longitudinally through the housing 25' and the margins 52 are rounded so as to permit the entrance between of the plug prongs as they are engaged with the bus bars.

The bus bars 12' and 12a' are also cut out as at 49' but these cuts are widened to form considerable spaces between adjacent sections of the jaws 15' as shown.

This form of my invention is flexible lengthwise and may thus be bent and formed as necessary to follow the contour of the wall A' as shown in Figure 6. In this sort of installation the base and housing being of rubber of course bends easily while the slots 49' in the bus bars allow them to lead either outwardly or inwardly while still maintaining a continuous electrical connection through their base portions 13'. It will of course be apparent that a flexible unit of this kind may be readily applied to a wall of any contour without any cutting or fitting.

A terminal plate and end cap (not shown) may also be provided for this flexible unit in the same manner hereinbefore described.

While I have herein set forth certain preferred embodiments of my invention it is understood that I may vary from the same in minor structural details so as best to provide a practical device for the purposes intended, not departing from the spirit of the invention and within the scope of the appended claims.

I claim:

1. In a device of the kind described having a base strip of insulation material T-shaped in cross section and contact means along either side of the central web of the base strip, each contact means being of U-shape so as to have jaws to engage opposite sides of each contact of a plug to hold the same and maintain electrical engagement independently of the central web, a sectional housing for the base strip and contact means including complementary sections right angular in cross section and fitted over the base strip, one at either side of the central web, the outer free margins of the sections being grooved and disposed in spaced relation to the outer face of the central web of the base strip, continuous flexible rubber beads mounted in the said grooves of the housing sections, and a continuous flat center strip of flexible rubber secured along the outer face of the central web of the base strip in co-operative alignment with the marginal rubber beads of the housing sections and arranged to normally contact at their opposite margins the said rubber beads of the housing sections whereby the housing is normally closed against foreign matter.

2. In a device of the kind described having an insulation base in strip form having an integrally formed central rib and contact means secured along opposite sides of the rib, each contact means being a strip of U-shape so as to have jaws to engage opposite sides of each contact of a plug to hold the same and maintain electrical engagement independently of the central web, said jaws being slotted at relatively close intervals along their free edges so that the device may be curved to conform to adjacent structure, housing sections in elongated form extended from the opposite margins of the base over said contact means and outwardly towards the free edge of the central rib thereof, the outer free margins of the housing sections having grooves, continuous flexible rubber strips secured in the grooves of the housing sections, and a continuous center strip of flexible rubber secured along the outer free edge of the central rib of the base strip in cooperative alignment with the marginal rubber strips of the housing sections and arranged to normally close together.

JAMES R. BROCKMAN.